UNITED STATES PATENT OFFICE.

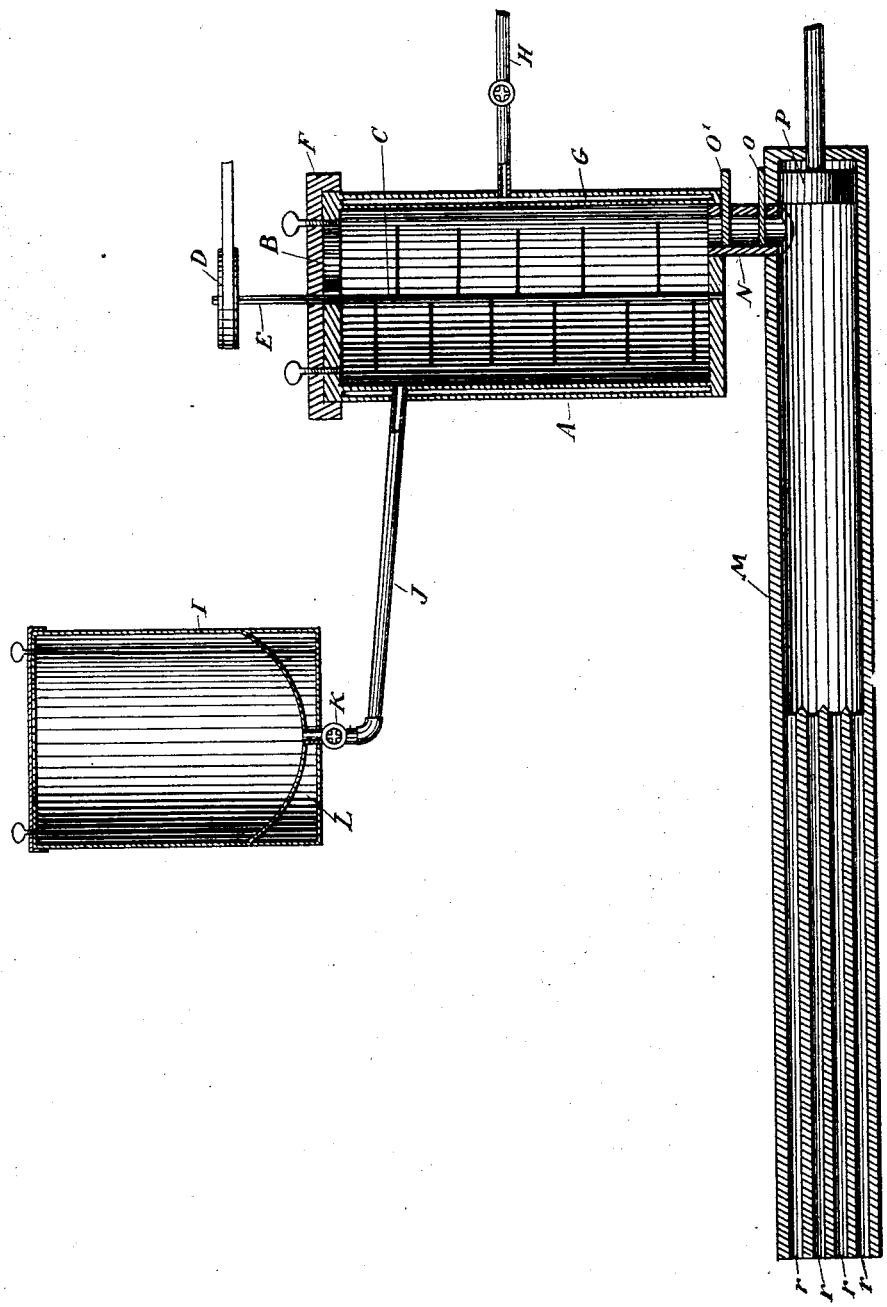

CHARLES J. HOLMES, OF SAN FRANCISCO, CALIFORNIA.

PROCESS OF MANUFACTURING ARTIFICIAL FUEL.

SPECIFICATION forming part of Letters Patent No. 710,580, dated October 7, 1902.

Application filed December 6, 1901. Serial No. 84,938. (No specimens.)

*To all whom it may concern:*

Be it known that I, CHARLES J. HOLMES, a citizen of the United States, residing in the city and county of San Francisco, State of California, have invented certain new and useful Improvements in Processes of Manufacturing Artificial Fuel; and I do hereby declare the following to be a full, clear, and exact description of said invention, such as will enable others skilled in the art to which it most nearly appertains to make, use, and practice the same.

My invention relates to an improved process for combining volatile inflammable substances, such as liquid hydrocarbons, with non-soluble combustible substances—such as coal, wood fiber, and the like—and forming them into bricks, blocks, or briquets, so as to produce an artificial fuel or fire-kindler having especially valuable properties; and it consists, first, in evaporating the non-soluble substances until all moisture is removed, so that they become highly absorbent. These dry non-soluble substances I then comminute or reduce to a granular condition and combine them with the liquid hydrocarbon at a normal temperature, so that none of the volatile portions of the hydrocarbon can escape, but the whole will be absorbed into the body of the non-soluble substances. I then take a fusible combustible substance, such as resin, and after fusing it with heat stir the whole mass together in a hermetically-closed vessel, so that when the mass is cooled each grain and particle will be covered and coated with a thin veneer or coating of resin, which prevents evaporation of the volatile portion of the hydrocarbon.

In the accompanying drawing I have represented an apparatus which is highly adapted to carry out my improved process, in which the figure represents a vertical section showing the construction and relation of the parts.

A in the drawing represents the mixing vessel, having a manhole-opening B in its top. A stirrer C is mounted in this vessel, so as to be rotated by power applied to the pulley D at the upper end of its driving-shaft E. A cover F is adapted to be screwed down on top of the vessel and hermetically close the manhole. Surrounding the vessel is a steam-space G, into which steam is admitted through a pipe H in order to heat the contents of the vessel when desired. Into this vessel the pulverized dry combustible substance is first placed and the liquid hydrocarbon at a normal temperature poured over it until the dry particles have become thoroughly saturated. The manhole-opening B is then closed and sealed.

I is another vessel which is supported at an elevation a little higher than the vessel A. Its bottom is connected with the vessel A by a pipe J, through which the contents of the vessel I can be transferred to the vessel A. A cock $k$ in the length of this pipe serves to open or close communication between the vessels. The vessel I has a double bottom, and the space L between these two bottoms forms a steam-space for heating the contents of the vessel. In this vessel I, I then place some soluble substance, such as resin, and after closing the top of the vessel I apply heat, so as to liquefy the substance. When thoroughly liquefied, I open the cock $k$ and allow the resin to flow down the pipe J into the vessel A, after which I close the cock $k$. Steam is then introduced into the steam-space surrounding the vessel A, so as to heat the contents of the vessel, and the stirrer C set in motion, so as to mix, agitate, and thoroughly incorporate the introduced liquid substance with the previously-saturated contents of the vessel. The bottom of the vessel A is connected with one end of a horizontal cylinder M by a short pipe N, and two sliding valves $o$ $o'$ are adapted to close the pipe at each end. After the mass has been thoroughly mixed in vessel A under heat the valves $o$ $o'$ are opened and the stirring continued until the entire charge has been transferred from the vessel A to the horizontal cylinder. The valve $o$ is then closed and a piston or plunger P is driven forward through the cylinder, so as to force the mixture through a series of molding-tubes $r$ $r$ $r$, which are connected with the opposite end of the cylinder. As the material passes through these molding-tubes it becomes cooled, and the molded rods ejected therefrom are cut off into lengths to form blocks or briquets for use.

By this process I preserve all the essential qualities of the hydrocarbon or other volatile agent, because no heat is applied until the hydrocarbon at a normal temperature is absorbed into the non-soluble and absorbent combustible substance, and the entire process is conducted in hermetically-closed vessels, so that no portion can escape. The fused coating agent being thoroughly incorporated by the stirrer surrounds the saturated particles in a thin layer which upon cooling forms a veneer or covering which incloses each particle and locks the inclosed volatile inflammable substances, so that the finished blocks or briquets contain the entire units of heat originally contained in the hydrocarbon. The resulting briquets or blocks will then have the quality of being consumed gradually, burning with a long steady flame, like a candle, and will be especially useful as a fire-kindler. I have demonstrated by actual experiments that a briquet formed by this process weighing one ounce will kindle and set fire to a grate filled with Wellington coal.

Having thus described my invention, what I claim is—

1. The process of manufacturing concrete artificial fuel containing liquid hydrocarbon as an element, consisting, first, in saturating dry, absorbent, combustible substances with the liquid hydrocarbon at normal temperature, secondly, confining said saturated substances so as to prevent the escape of any of the volatile parts of the hydrocarbon, thirdly, agitating said saturated substances, while so confined with a fusible combustible substance in the presence of heat, and lastly, casting or molding the combined substances into briquets or blocks, substantially as described.

2. The process of manufacturing concrete artificial fuel containing liquid hydrocarbon as an element, consisting first, in desiccating the non-soluble, combustible substances, secondly, in saturating said dry, non-soluble substances with liquid hydrocarbon at normal temperature, thirdly, confining said saturated substances so as to prevent the escape of the volatile parts of the hydrocarbon, fourthly, agitating said saturated substances, while so confined, with a fusible combustible substance in the presence of heat, and lastly casting or molding the combined substances into briquets or blocks, substantially as described.

3. In the manufacture of concrete artificial fuel, the process of first saturating dry, non-soluble, combustible substances with liquid hydrocarbon at a normal temperature, secondly confining the saturated substances so as to prevent the escape of the volatile portions of the hydrocarbon; thirdly, applying heat to the confined substances, fourthly, adding a fusible combustible and while so confined agitating the mass until all the particles are covered or coated with the fused substance, and lastly, casting or pressing the substances into briquets or blocks before the substances are released from confinement, substantially as described.

4. In the manufacture of concrete artificial fuel containing a liquid hydrocarbon, the process of confining the saturated non-soluble combustible substances so as to prevent the escape of the volatile parts of the hydrocarbon, and then adding a fusible combustible substance, and agitating the whole, while so confined until the mass is cool, substantially as described.

In witness whereof I have hereunto signed my name before two witnesses.

CHARLES J. HOLMES.

Witnesses:
A. ASHDOWN,
N. E. W. SMITH.